Figure 15:
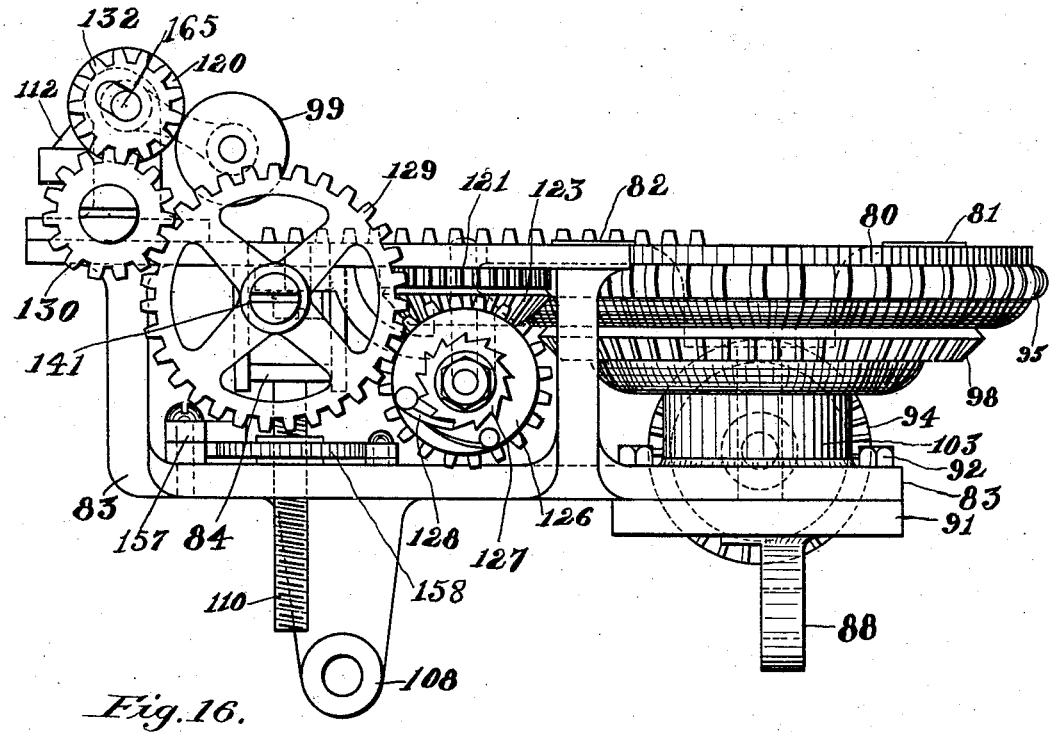

No. 772,341. PATENTED OCT. 18, 1904.
L. C. CROWELL, DEC'D.
L. F. CROWELL, ADMINISTRATOR.
LABELING MACHINE.
APPLICATION FILED NOV. 16, 1903.
NO MODEL. 9 SHEETS—SHEET 1.
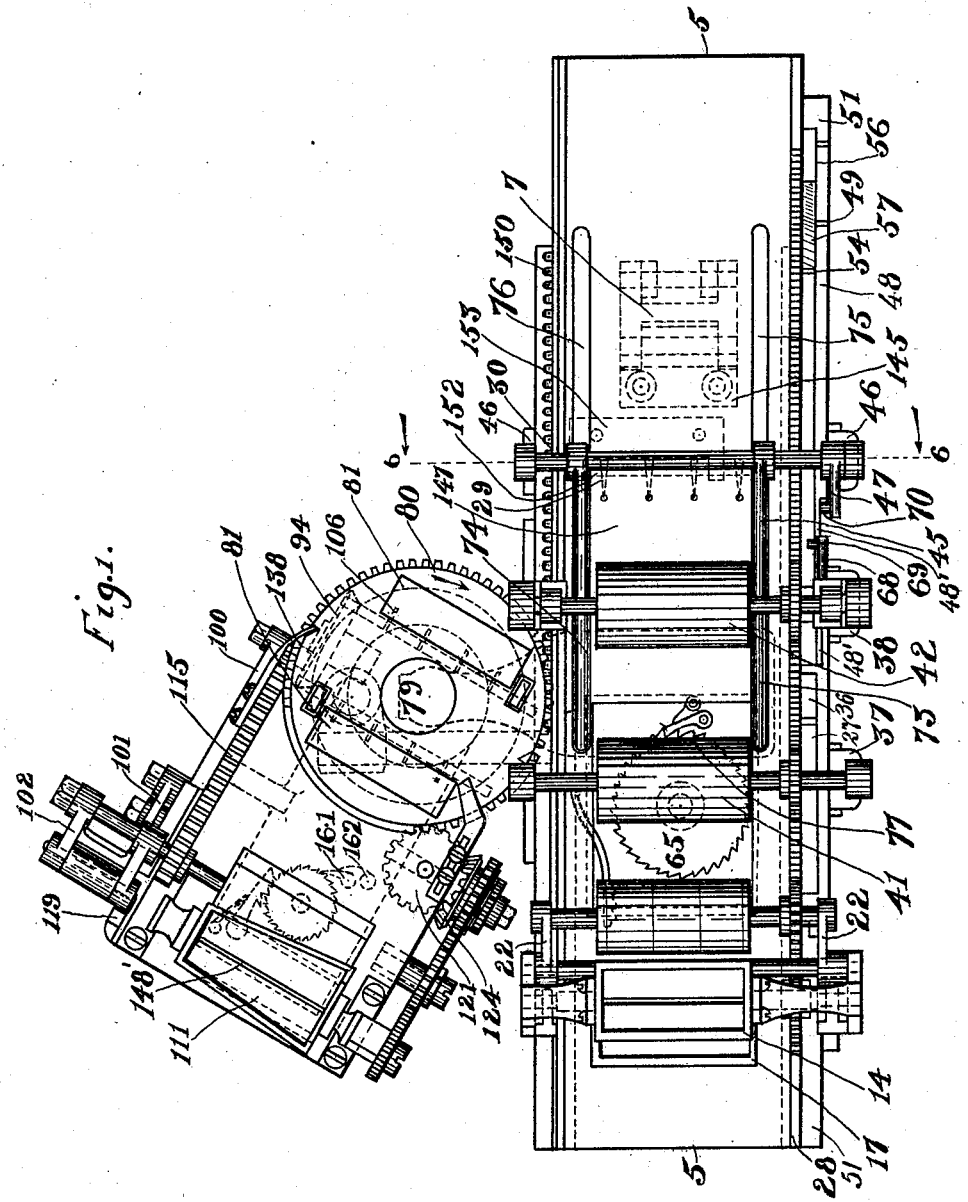
Witnesses:
Luther F. Crowell
Robert H. Dring.
Inventor,
Luther C. Crowell,
by Charles F. A. Smith,
Atty.

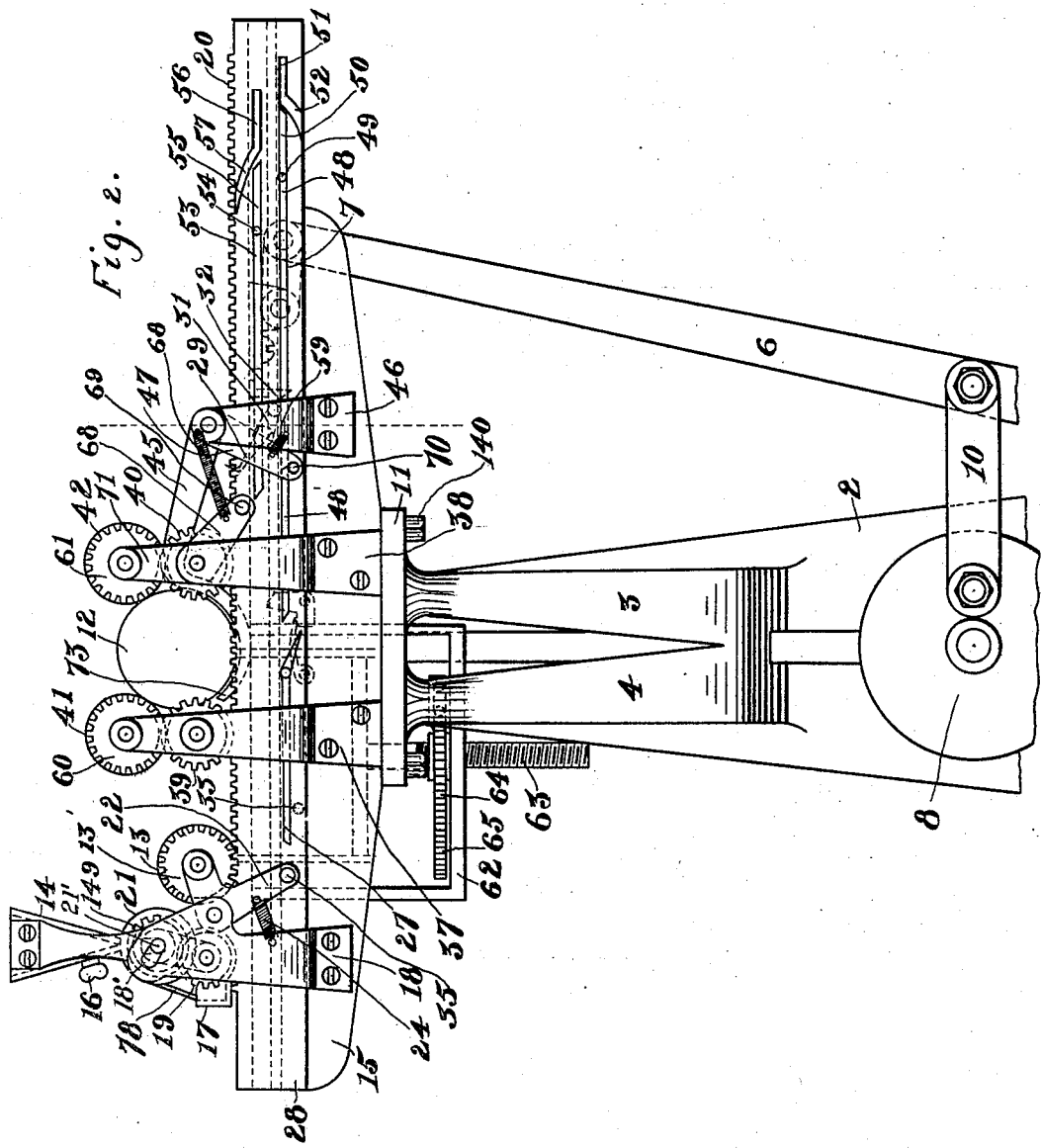

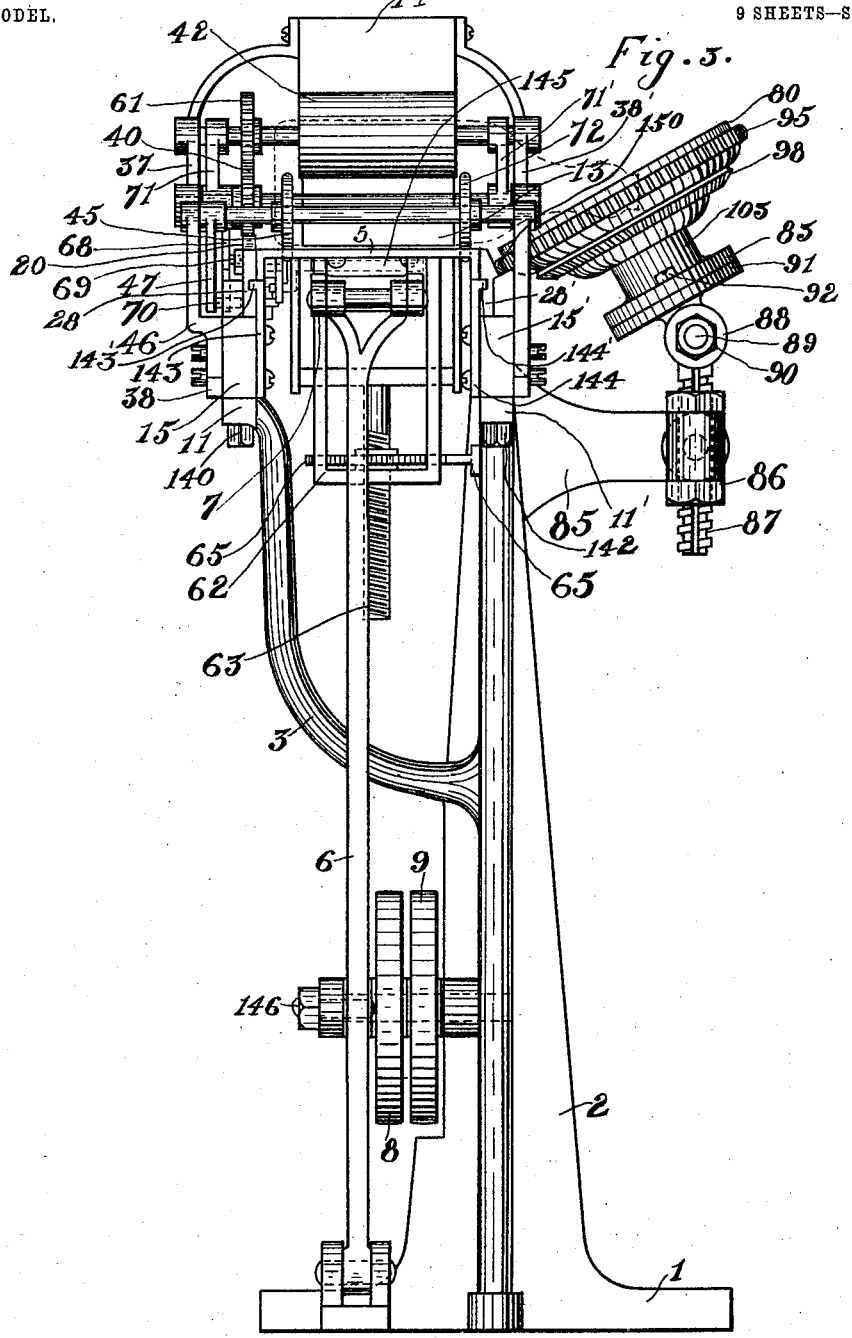

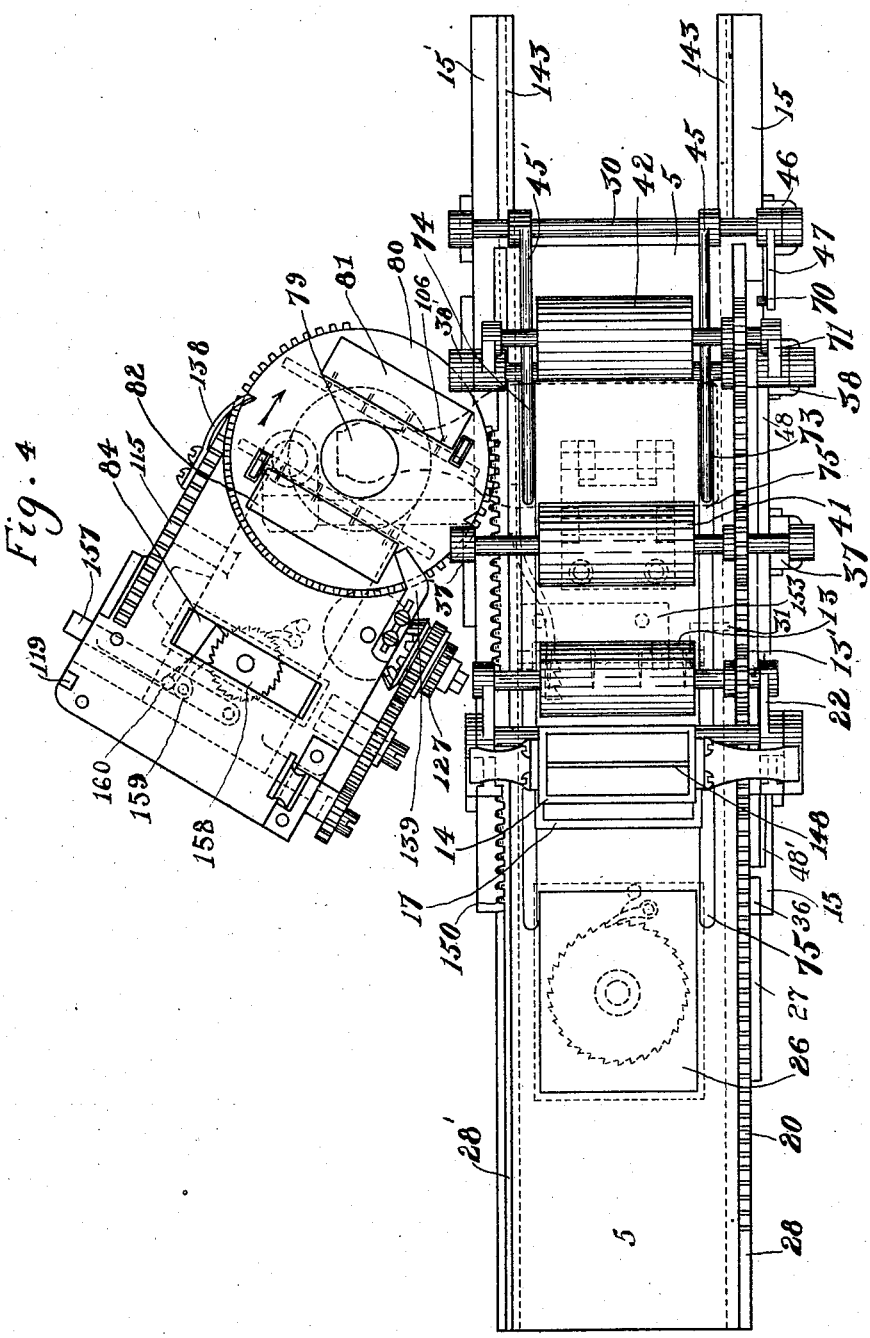

No. 772,341. PATENTED OCT. 18, 1904.
L. C. CROWELL, DEC'D.
L. F. CROWELL, ADMINISTRATOR.
LABELING MACHINE.
APPLICATION FILED NOV. 16, 1903.
NO MODEL. 9 SHEETS—SHEET 5.
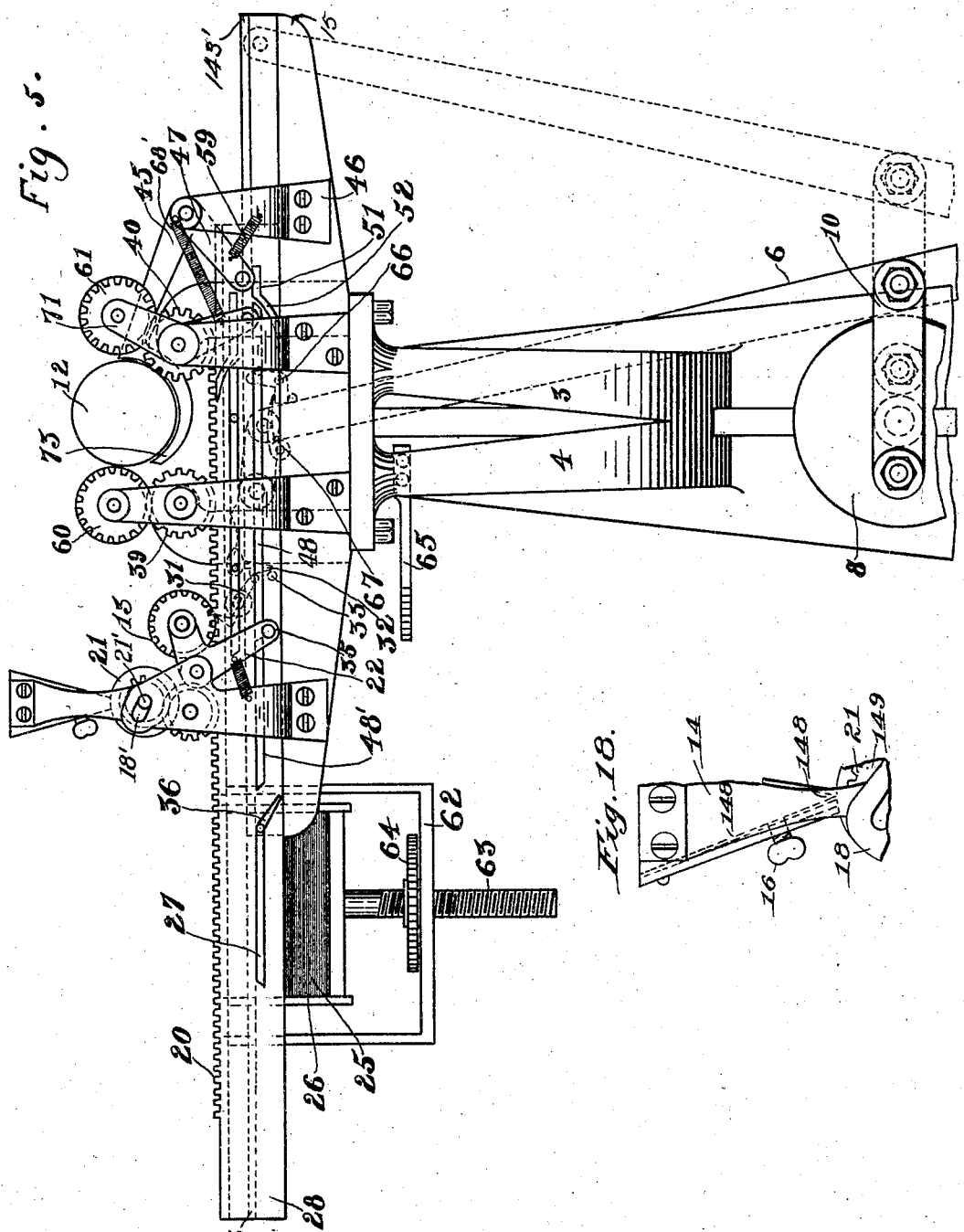
Witnesses:
Inventor,
Luther C. Crowell,
by Charles F. A. Smith,
Atty.

No. 772,341. PATENTED OCT. 18, 1904.
L. C. CROWELL, DEC'D.
L. F. CROWELL, ADMINISTRATOR.
LABELING MACHINE.
APPLICATION FILED NOV. 16, 1903.
NO MODEL. 9 SHEETS—SHEET 6.
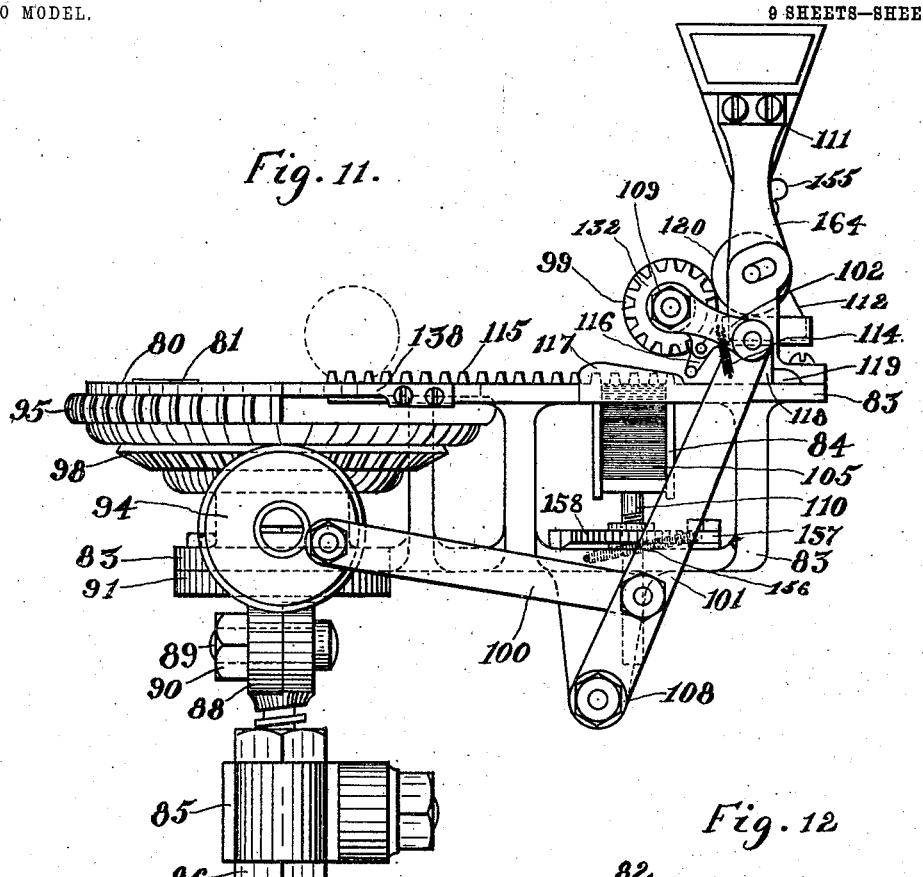
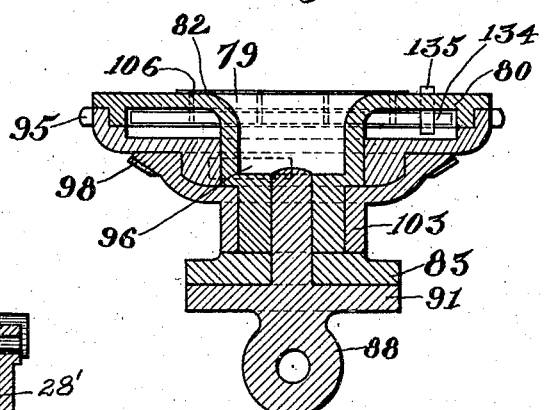
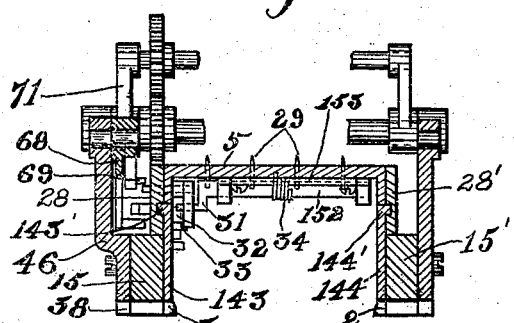
Witnesses:
Robert W. Howard
Robert H. Dring
Inventor:
Luther C. Crowell,
by Charles F. A. Smith,
Atty.

No. 772,341. PATENTED OCT. 18, 1904.
L. C. CROWELL, DEC'D.
L. F. CROWELL, ADMINISTRATOR.
LABELING MACHINE.
APPLICATION FILED NOV. 16, 1903.
NO MODEL. 9 SHEETS—SHEET 7.
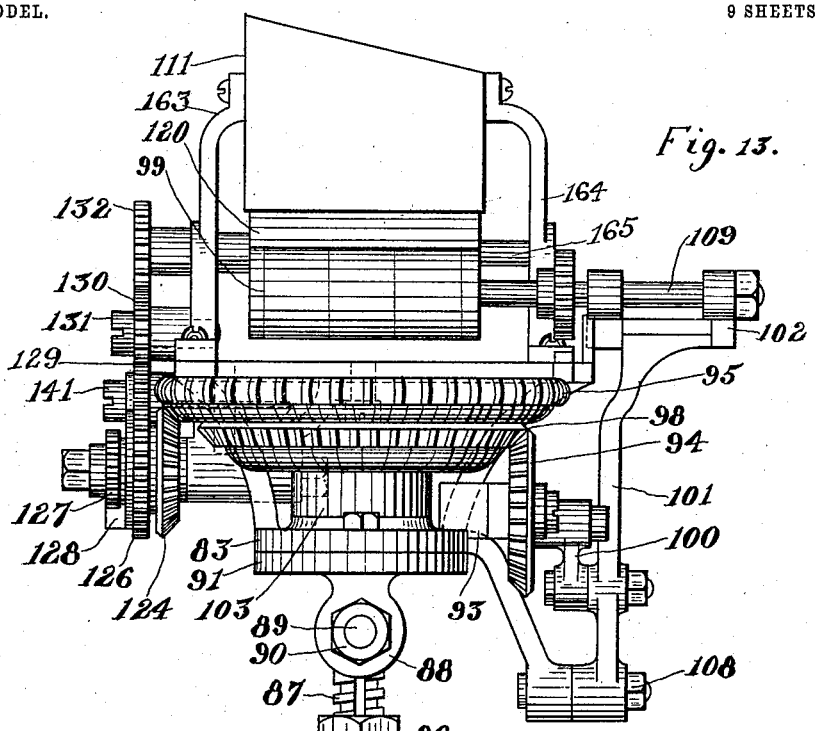
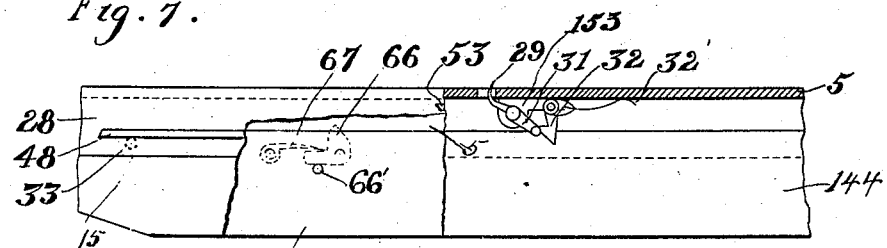
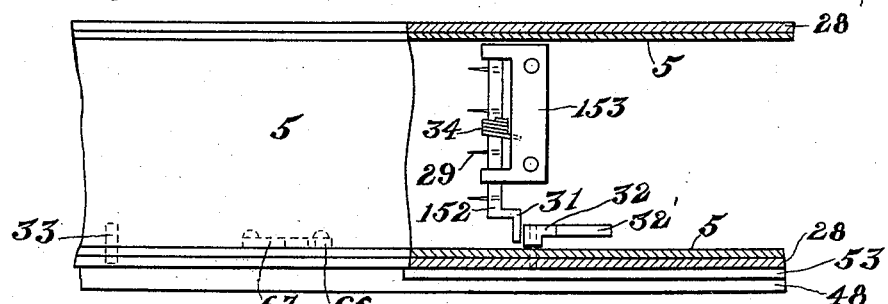
Witnesses:
Robert W Howard
Robert H Dring
Inventor:
Luther C. Crowell,
by Chas. F. A. Smith,
Atty.

No. 772,341.

PATENTED OCT. 18, 1904.

L. C. CROWELL, DEC'D.
L. F. CROWELL, ADMINISTRATOR.

LABELING MACHINE.
APPLICATION FILED NOV. 16, 1903.

NO MODEL.

9 SHEETS—SHEET 8.

Witnesses:
Robert W. Howard
Robert H. Dring

Inventor:
Luther C. Crowell,
by Chas. F. A. Smith
Atty.

No. 772,341. PATENTED OCT. 18, 1904.
L. C. CROWELL, DEC'D.
L. F. CROWELL, ADMINISTRATOR.
LABELING MACHINE.
APPLICATION FILED NOV. 16, 1903.

NO MODEL. 9 SHEETS—SHEET 9.

Witnesses:
Robert W. Howard
Robert H. Dring.

Inventor:
Luther C. Crowell,
by Charles F. A. Smith
Atty.

No. 772,341. Patented October 18, 1904.

UNITED STATES PATENT OFFICE.

LUTHER CHILD CROWELL, OF SOUTH WELLFLEET, MASSACHUSETTS; LUTHER F. CROWELL, ADMINISTRATOR OF SAID LUTHER CHILD CROWELL, DECEASED, ASSIGNOR OF ONE-THIRD TO CHARLES F. A. SMITH AND ROBERT W. HOWARD, OF BOSTON, MASSACHUSETTS.

LABELING-MACHINE.

SPECIFICATION forming part of Letters Patent No. 772,341, dated October 18, 1904.

Application filed November 16, 1903. Serial No. 181,354. (No model.)

*To all whom it may concern:*

Be it known that I, LUTHER CHILD CROWELL, of South Wellfleet, in the county of Barnstable and Commonwealth of Massachusetts, have invented certain new and useful Improvements in Labeling-Machines, fully described and represented in the following specification and the accompanying drawings, forming a part of the same.

The majority of bottles being made in the form of a cylinder, with the neck tapering therefrom to the nose or stopper end at a more or less acute angle or curve and neck-labels being usually made in attractive designs, ornamental in effect, it has been found very difficult to provide a machine which will apply the neck-label to its conspicuous position on the neck of a bottle, where it makes an important advertising medium, and at the same time apply a body-label to the same bottle; and so the prime object of my invention is to provide an improved form of labeling-machine which will apply both the body and neck label of a bottle at the same time—that is, a mechanical combination which will perform the operations of accurately and economically affixing body-labels to the body portions of bottles and simultaneously applying neck-labels to the conical or neck portions of the same bottles rapidly, accurately, and without wrinkling the labels.

Another object of my invention is to provide a bottle-releasing mechanism which will allow bottles to be fed and released from the machine rapidly; and, finally, my invention has for its object to automatically smooth the labels out and smoothly and firmly press the labels around the bottle while the bottle revolves above the elastic label seats or beds which are on the body-label table and neck-label disk.

The invention consists in the combination of elements and certain parts of construction entailed in the combination of said elements to obtain the desired result.

A full understanding of the invention can best be given by a detailed description of a preferred construction embodying the various features of the invention, and such a description will now be given in connection with the accompanying drawings, and I attain my object by the mechanism there illustrated, showing such preferred construction, and the features forming the invention will then be specifically pointed out in the claims.

Figure 9:
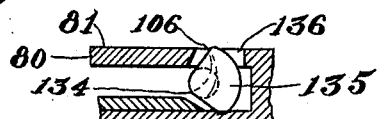
Figure 10:
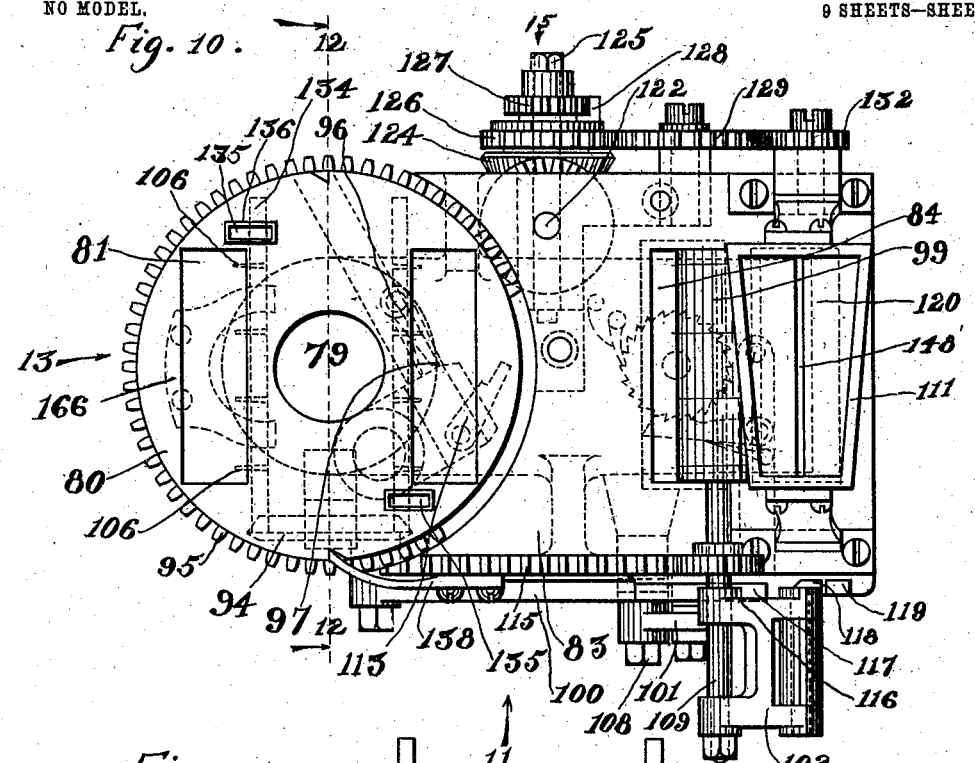

In the accompanying drawings, Figure 1 is a plan view of a label-attaching machine embodying my improvements, although the neck-labeling mechanism is shown horizontally and not at an angle to suit that of the bottle to be labeled. Fig. 2 is a front elevation of the body-label portion of the same machine at the extreme backward end of its movement and with the lower portion of the standard broken away and with the neck-labeling mechanism being omitted. Fig. 3 is a front end elevation with the neck-label-carrying and neck-label-pasting devices removed. Fig. 4 is a plan view showing the position of the different parts excepting the neck-label pasting and applying devices and with the body-label-carrying mechanism at the extreme end of its movement. Fig. 5 is a front elevation of the same parts shown in Fig. 2 with the body-label-carrying mechanism at the extreme forward end of its movement and with the neck-labeling mechanism omitted. Fig. 6 is a transverse sectional view of the body-label-carrying table on the line 6 6 of Fig. 1 looking from the right, showing the label-retaining devices for taking the end of the body-label from the paste-roller. Fig. 7 is a front elevation of a part of the machine, partly in section, showing the pins projecting above the body-label bed. Fig. 8 is a plan view, partly in section, of the parts shown in Fig. 7. Fig. 9 is a detail showing one of the neck-label gripper-pins and triangular cams. Fig. 10 is a plan view of the neck-labeling portion of the machine. Fig. 11 is an elevation of the parts shown in Fig. 10 looking in the direction of arrow 11 of Fig. 10. Fig. 12 is a sectional view on the line 12 12 of Fig.

Figure 16:
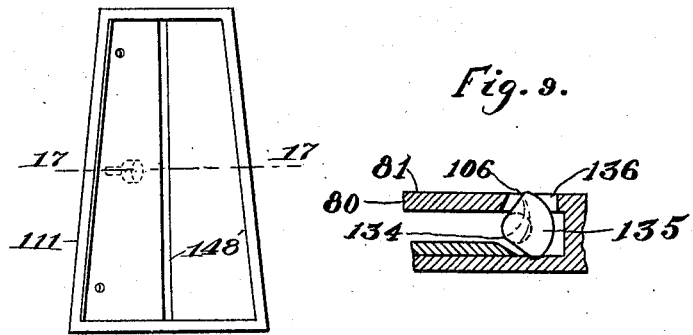
Figure 17:
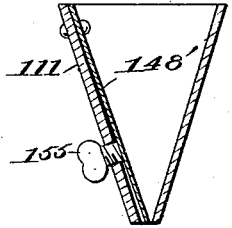
Figure 14:
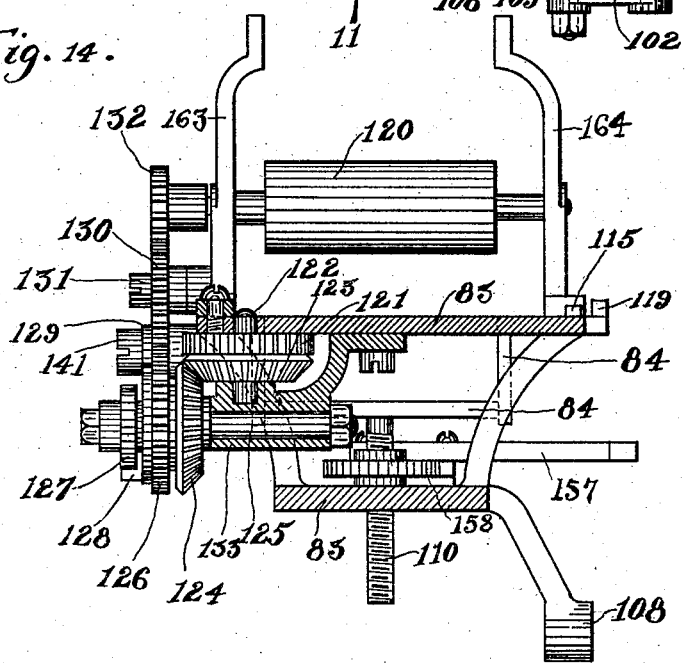

10 in the direction of the arrows. Fig. 13 is a front elevation looking in the direction of the arrow 13 in Fig. 10. Fig. 14 is a view, partly in section, of some of the parts shown in Fig. 13. Fig. 15 is an elevation of the parts shown in Fig. 10 looking in the direction indicated by arrow 15. Fig. 16 is a top view of the neck-label paste-reservoir. Fig. 17 is a sectional view of the same on the line 17 17 of Fig. 16. Fig. 18 is a partial end view of the body-label paste-reservoir.

By comparing Figs. 1 and 2 with Figs. 4 and 5 it will be seen that Figs. 4 and 5 show the label-table at the extreme end of its forward movement to the left, and it is during this forward movement from right to left that the labeled bottle is removed from the curved fingers and the unlabeled bottle is placed upon the curved fingers ready to be lowered to receive the labels when the label-bed upon the table and the label-bed upon the disk are in the proper positions. As the table moves to the right the label-carrying rollers receive a layer of paste on their surface, and gripper-pins protruding through an elongated opening in the body-table at the end of the body-label bed farthest from the pack of body-labels and the neck-label gripper-pins on the shaft nearest the neck-label-carrying roller receive the labels from the label-carrying rollers and simultaneously lay them upon the label-beds, in which position they rest when the machine is in the position shown in Figs. 1 and 2 and the bottle has been lowered by the arms and is ready to be revolved and receive the pasted labels. As the table moves forward to the left it revolves the disk in the direction of the arrow shown in Fig. 4, and the bottle being revolved, as will be hereinafter explained, the labels are applied to the bottle. Simultaneously with the applying of the labels to the bottle the body-label-carrying roller, which has received its coat of paste, revolves over the unprinted side of the upper label of the pack of body-labels, and this label adheres to it as it revolves, and when it reaches the gummed end of the pack this top label is readily separated from the pack. A somewhat similar roller has simultaneously revolved over the pack of neck-labels and attached the unprinted side of the upper label to it. It will thus be seen that as the labels caught by the gripper-pins are peeled from the rollers and laid upon the label-beds they are laid with the unprinted side, upon which is the paste, uppermost and ready to be revolved around the bottle.

Referring to the drawings, numeral 1 designates a base upon which is mounted a framework or standard 2 of any suitable design and supports at its top a table 11', which in its turn supports the plate 15', which is securely held thereto by one or more bolts 142, and this standard 2 and plate 11' may be strengthened, if desired, by one or more ribs, as shown in Figs. 2 and 3 of the drawings. The standard 2 has also extending forward from it the arms 3 and 4, which support at their upper portion the table 11, which table supports the plate 15, which is suitably bolted to it by one or more bolts 140. The base 1, standard 2, arms 3 and 4, and tables 11 and 11' are preferably cast in one piece; but, if desired, they may be cast separately and then secured together by bolts or any other desirable means.

Upon the plate 15 rests the bar 28, having on its upper portion the rack 20, the uses of which rack will be hereinafter explained, (see Figs. 2, 3, and 5,) and upon the plate 15' rests the bar 28', having on its upper outer side the rack 150, in which mesh the teeth of the driving-gear 95 of the neck-label disk 80.

Secured by bolts or other means to the inner side of the plate 15 is a vertical plate 143, having at its top a foot or other projection 143' extending forward, and it is inserted in an elongated opening or runway on the inner side of the bar 28. Upon the opposite inner side of the machine and against the plate 15' is another plate, 144, with a foot 144' extending backward and into a similar opening or runway on the inner side of the bar 28'. These bars 28 28' being rigidly secured to the label-table 5 travel with said table and run upon the projections or feet 143' 144'. These vertical plates 143 and 144 are also provided to support the sliding label-carrying table 5, as shown in Fig. 3 of the drawings, and to the plates 15 and 15' of the framework 2 are attached the brackets which support the rollers, &c. Attached to the under side of the table 5 by bolts or screws is a plate 145, (see Fig. 1,) and connected with this plate and carried by the table 5 is the body-label lever 6, which is connected with the plate 145 by a link 7. This lever 6 is pivoted at its opposite and lower end to the framework 2, as shown in Fig. 3, and said lever is connected with a driving-wheel 8 by means of a link 10. This driving-wheel 8 is suitably journaled on a shaft 146, and this same shaft carries a loose pulley 9. The lever 6 when in operation moves the table 5, the label-carrier, the label-paste-carrying roller 13, and the elastic-seat label-carrier 147, which latter is moved backward and forward under the bottle 12.

At the extreme left end of the framework of the machine are suitable brackets 18, which brackets are rigidly attached by screws or other means to the plates 15 and 15' of the framework 2, which brackets support a paste-fountain 14, which fountain applies paste to the roller 21, the flow therefrom being regulated by a lip 148, which lip is adjusted by the screw 16. A drip-box 17 is situated beneath the paste-fountain 14 and above the label-carrying table 5 and is provided with a doctor-blade 78 to further regulate the body of paste on the roller 21, as shown in Fig. 2 of the drawings. This roller 21 has its shaft 21' journaled in the elongated slots 18' in the brackets 18, the lower portions of these slots being nearest to the roller 13, so that the weight of the roller 21 and its shaft will normally hold it downward toward the roller 13, but will allow it to be pushed upward and backward when the roller 13 acts against it, thus allowing a free movement of the stud 35 over the cam-rib 27, as will be hereinafter explained, and the roller 21 and its shaft is provided with a gear 149, meshing with the intermediate gear 19, which engages the rack 20, formed on the upper portion of the bar 28 above the plate 15. The intermediate gear 19 is suitably journaled in the brackets 18, and to these brackets on the opposite side from the doctor-blade 78 is attached a pair of pivoted arms 22 22', which support a roller 13, and the roller is held in a downward position by a spring 24, attached at one end to the pivoted arm 22 and at its other end to the bracket 18. The roller 13, which is supported by the pivoted arms 22 22', has a gear 13', which also engages the rack 20. As the label-carrying table 5 and the rack 20 move from the position at the right, as shown in Fig. 2, to the left, as shown in Fig. 5, the gear 13', meshing with the teeth of the rack 20, revolves the roller 13, the gears 149, meshing with the gear 19, which engages with the rack 20, revolves the roller 21, and while the roller 21 is receiving its coat of paste the roller 13, which has previously received its coat of paste, as will be hereinafter explained, is revolving over the uppermost label of the body-labels 25. These body-labels 25 are supported in a suitable framework 26, which framework is attached to the moving table 5 in such a position as will insure the roller 13 engaging the front and ungummed end of the body-label when the table 5 is at the extreme end of the motion—that is, to the right. At this time the roller 13, having received paste from contact with the label-paste-carrier roller 21, drops upon the uppermost label of the body-labels 25 by reason of the foot 35, which is attached to the long end of the arm 22, leaving the supporting-track 27, upon which it has previously rested and which is attached to the overhanging plate or bar 28 and which plate is secured to the moving table 5, as previously explained, the arm 22 carrying the label-paste-carrier roller 13 downward by reason of the contracting of the spring 24, so that this roller drops upon the uppermost label of the body-labels 25. These body-labels are secured in packs and gummed together at one end and placed in the carrier with the unlettered side uppermost, as will be clear without further description. The forward motion of the table—that is, the movement to the left—will cause the paste-roller 13 to pick up the label and wrap it about its surface, applying paste thereto until it reaches the gummed end, when this upper label will be separated from the pack of labels, each label being readily separated in its turn. The diameter of the roller 13 is such as will cause the forward end of the body-label to lie over and set off the curved rocking pins 29, adjustably mounted to a shaft 152, (see Fig. 1,) which shaft is suitably journaled in the plate 153, rigidly secured to the under side of the table 5. This is approximately the other end of the movement of the table 5, and the releasing of these pins will be hereinafter explained. The return movement of the table and rack now begins, and the stud 35 on the pivoted arm or lever 22 passes upward on the tongue 36, which is pivoted at the right end of the supporting-track or cam-rib 27, and as this stud 35 passes upward it raises the roller 13 into contact with the label-paste-carrying or fountain roller 21, so that this roller 13 will receive a coat of paste from the fountain-roller 21, the fountain-roller 21 being revolved by the gears 149 and 19, the intermediate gear 19 being moved by the rack 20 until the extreme end of the backward movement to the right; but before this movement is completed the stud 35 has left the track 27, dropping downward and carrying downward the roller 13.

Suitable brackets 37 and 38, attached to the plate 15, and suitable brackets 37' and 38', attached to the plate 15', support the intermediate driving-gears 39 and 40 and elastically-covered roller 41 and the oppositely-pivoted mounted roller 42, mounted in the arms or brackets 71 and 71', which arms or brackets 71 71' are pivoted and supported by the brackets 38 38'. These rollers 41 42 have their respective gears 60 and 61 meshing with the intermediate gears 39 and 40, which intermediate gears engage the rack 20 and drive said rollers.

In brackets 46, secured to the plates 15 15' of the framework 2, are pivotally mounted the arms 45 45', and these arms have at their extreme ends the uplifting curved fingers 73 and 74, and suitable grooves or elongated slots 75 and 76 are made in the table 5, as shown in Fig. 1 of the drawings, to receive the curved lifting-fingers 73 and 74 in such positions as will not interfere with the label.

The arm 45 has a downwardly-projecting arm 47, having at its extreme end a stud 70, which stud is arranged to engage the rib 51, its tongue 52, and the cam-rib 48. The cam-rib 48 is attached to the front side of the bar 28, being pivoted on a stud 49, and extends beyond this stud to the right, as at 50, so that the downwardly-projecting arm 47, which is controlled by this rib 48 upon the backward movement of the table to the right, and when the table reaches the extreme right the stud 70 drops off the farther end of the board part of the rib 48, the rib 48 having a narrow strip 48' extending beyond the center of the bar 28, which narrow strip is used to keep the stud 35 down until it reaches the tongue 36, when it rides up on the tongue 36 onto the rib 27, pressing the roller 13 against the roller 21.

The stud 70 is held in a downward position by a spring 59, which spring is attached to the arm 47 and the bracket 46, and is held in this downward position while the table and bar 28 move forward from the right to the left, so that on reaching one end of the track of the bed 147 stud 70 engages the spring-supporting tongue 52 of the fixed rib 51 which rib 51 is attached to the bar 28, and as the stud 70 passes up the tongue onto the rib 51 the arm 47 is lifted, which in turn lifts the arms 45 45' and the curved fingers 73 74, raising the bottle 12 which had previously been placed in these uplifting curved fingers, and as the table 5 and bars 28 28' move backward from left to right the stud 70 passing over the rib 48 keeps the curved fingers in an uplifted position and allows the bottle 12 to be taken from these fingers and a new bottle 12 placed thereon, and when the table has reached the extreme backward position the stud 70 drops off the rib 48, as has been previously explained and as shown in Fig. 2 as just having dropped down, and allows the curved fingers to lower into the elongated slots 75 76 and the bottle rests upon the table, in which position it rests and revolves above the pasted label when the table is moved forward from the right to the left. If the positions of the brackets which support the rollers 41 42 were rigidly secured to the frame 15, it would be impossible to lift the bottle, and so I have provided the roller 42 with the pivoted brackets or arms 71 71', which are pivoted to the brackets 38 38'.

The arm or bracket 71' has a downward-extending arm 68, as shown in Figs. 2 and 5 of the drawings, which has at its outer end a stud 69, and the arm 71 is normally held in a vertical position pressing the roller 42 against any bottle 12 which may have been previously placed upon the table 5, the arm 71 being held in this vertical position by the arm 68, which is held in its upper position by a spring 68', which connects the arm 68 to some upper portion of the bracket 46, as shown in Fig. 2 of the drawings.

When the table is at the extreme backward position, as shown in Fig. 2, the arm 68 has been raised above the outer end of a cam-rib 53, which cam-rib is pivoted on the stud 54 attached to the bar 28, and as the table moves forward to the left the stud 69 passes on the upper side of the cam-rib 53 to a point beyond the stud 54 upon the further projection 55 of the cam-rib 53 until it reaches the tongue 57 of the rib 56, as is clearly shown in Fig. 2, when this tongue forces the stud 69 and the arm 68 downward, in which position it rests against the under side of the rib 56 when the table is at the extreme left, and as this stud and arm 68 are forced downward the arms 71 71' and the roller 42 are drawn backward to the right, allowing the curved fingers to raise the bottle, and as the table moves backward to the right the stud passes along on the under side of the portion 55 of the rib 53, passing the stud 54, and continues along the under side of the rib 53, thus allowing a sufficient time in which the curved fingers are held up and the roller 42 held in a backward position to take out the labeled bottle and insert an unlabeled bottle, the stud being held until nearly the extreme end of the backward movement, when it reaches the end of this rib and is pulled upward by the contraction of the spring 68'.

It is preferable that a piece of rubber or other elastic material be secured to the bed of the table 5, upon which the label is laid, and this table 5 carries the framework 26, which is attached to it on its under side and which supports the body-labels 25. Also attached to the under side of the table 5 is the framework 62, which partly surrounds the label-carrying framework 26, and this framework 62 supports the screw 63 and its ratchet 64. Attached to the main frame 2 is the pawl 65, which engages one or more teeth of the ratchet 64 on the backward movement of the table 5, turning the ratchet 64 slightly and raising the screw 63 the thickness of one of the labels, and it will therefore be seen that the uppermost label of the pack is brought in such a position as to readily come in contact with the label-paste-carrying roller 13 on the forward movement of the table, this roller 13 pasting the unprinted side of the label, all but its farther end, which lies over the curved rocking pins 29, and as the table moves forward these pins become inserted in this unpasted gummed end of the label, peeling the same from the roller and laying the unpasted side upon the label-bed, the pasted side being upward and in readiness to be revolved around the bottle on the forward movement of the table.

In the movement of the table 5 when reaching the point where the free end of the label should meet the bottle the curved fingers 73 74 descend and the roller 42 moves forward, pressing the bottle downward in contact with the label, the oppositely-mounted roller 41 being in position to aid this action. The rollers 41 and 42 rotate the bottle from left to right above the label on the table 5 as the table is moved to the left; but the rollers 41 and 42 rotate the bottle at a slightly-increased speed to the movement of the table 5 to insure the smooth close application of the label on the bottle, and when the label has been almost wrapped around the bottle the pins 29, which had been inserted in the right end of the label when it was carried down from the label-carrier onto the bed of the table 5, are withdrawn, allowing the bottle and its applied label to be raised by the curved fingers 73 74, as will be hereinafter explained. The pins 29 are attached to the shaft 152, which shaft is journaled in the plate 153, and this plate is screwed to the under side of the table 5. A latch 32 is hung on a stud attached to the inner side of a flange projecting downward from the edge of the plate 5, which flange is shown in section in Fig. 6, and this latch 32 is provided with a spring 32' pressing against the under side of the table 5, and this spring keeps the latch 32 in nearly a vertical position. The latch 32 is provided with a seat for normally holding a pin-lever or crank-arm 31, which crank-arm 31 is attached to the shaft 152, so that when the arm of the crank 31 rests upon the seat the pins 29 are drawn downward and do not protrude above the upper surface of the table 5. A spring 34, attached to the shaft 152 and pressing against the plate 153, serves to swing the crank-arm 31 downward when not resting upon the seat of the spring-latch 32, and this spring securely turns and throws the pins 29 up through the elongated aperture into the free end of the label carried by the roller 13. Then the table, while the pins are inserted in the end of the label, moves to the extreme right, these pins holding the label and peeling it from the roller 13, laying it upon the label-bed of the table 5. After the table has reached the extreme right it moves forward again to the left, the pins 29 still remaining in the right end of the label and so remain until the bottle has been nearly labeled, when the crank-arm 31 strikes upon the slanting upper right side of a latch 66, which latch will be hereinafter explained, and is carried up onto the seat of the latch 32, in which position it remains until the latch 32 reaches the stud 33, attached to the inner side of the plate 143, when the latch 32 is pressed backward by this stud 33 and the crank-arm 31 again released or pushed off the latch 32, the spring 34 carrying the crank-arm downward and the pins 29 upward. The latch 66 is attached to a stud on the inner side of the plate 143 and has an arm resting against an underpin 66' and is held in place against the underpin 66' by a spring 67, securely attached to the inner side of the plate 143. The crank 31 when the table moves from left to right presses backward the latch 66 and rides over it. The spring 67 then presses the latch 66 back into place; but on the movement of the table from right to left the latch 66 is held solid against the pin 66' and forces the crank 31 up onto the seat of the latch 32.

The neck-label pasting and applying mechanism is in the rear of the machine, and will be farthest from the operator, the operator standing about opposite the bottom of the bottle, (shown in dotted lines in Fig. 1,) and thus standing at the front of the machine is able to easily take from the curved fingers the labeled bottle with his right hand and place upon these fingers with his left hand an unlabeled bottle. The bottle (shown in dotted lines in Fig. 1) has been lowered to the bed of the table 5 and to the disk 80 and is in a position to receive the body-label from the table as the table goes forward from right to left and simultaneously receive a neck-label from the label-bed 81 on disk 80 as the disk is moved in the direction of the arrow. The disk makes a half-revolution as the table is moved from right to left, so that on the next movement from right to left the label on label-bed 82 of disk 80 will be in place to apply the label to the neck of the next bottle. The revolving neck-label-carrying disk 80 is therefore arranged to rotate intermittently and is provided with the elastic seats or label-beds 81 and 82 to receive two labels in diametrically opposite positions on the disk 80.

The point of engagement of the table with the cylinder or disk 80 being coincident with the point where the conical portion of the bottle meets the cylindrical portion and a depression 79 in the disk 80 and its gears is made to permit of the labeling of bottles of acute angles—that is, the center 79 of the disk is depressed or removed as much as possible to admit of the nose of the bottles which are of shorter angle or size, as will be readily understood. The outer edges of the teeth 95 of the neck-label disk 80 are curved to provide for the angles with which it engages with the teeth 150, formed on the upper outer side of the rack-bar 28', so as to insure uniform distance. A framework 83 supports this disk 80, the label-holder 84, the pasting devices, and the label-carrying devices, so that when the angles of the neck-label-carrying disk 80 are changed all the parts mounted within move together. This framework 83 is adjustably held to the main framework 2 by a bracket 85, which carries at its end a boss 86, which receives the screw-shaft 87, which screw-shaft adjustably supports the frame 83 by means of the casting 91, which is adjustably held to the shaft 87 by means of the clamp-joint projection 88, bolt 89, and nut 90. The casting 91 carries the frame 83, adjustable by means of the bolt 92. This frame 83 carries the bracket 93, which supports the bevel-gear 94, which operates the label-carrying roller 99 by means of the connecting-levers 100, 101, and 102, and this frame 83 also supports the label-holder 84, the pasting devices, and the socket 103, which carries the disk 80 and its gear 95. The gear 95 being in constant contact with the teeth 150 of the rack-bar 28' of the body-label-carrying table 5 moves in unison with the table, while the label-carrying disk 80 moves only in the direction of the arrow shown in Figs. 1 and 4 when applying the label to the bottle. To operate the bevel-gear 94 in connection with the driving-gear 95, there is provided a pawl 96, (shown in dotted lines in Figs. 10 and 12,) which is secured to the under side of the gear 95 and engages with the notches 97 on the inside of the bevel-gear 98, which is geared with the bevel-gear 94, which operates the label-carrying roller 99, and on the backward movement of the table to the right the gear 95 goes backward, carrying with it the miter-gear 98, which drives the gear 94, (see Figs. 11 and 13,) and the gear 94 makes a complete revolution during one-half of a revolution of the driving-gear 98.

A rod-connecting link 100 is pivoted at one end to the gear 94 and at its other end to the lever 101, which lever 101 is pivoted at one end to the stud 108, attached to part of the frame 83, and it carries at its other end the broad-framed socket arm or lever 102, which is secured to the shaft 109, as clearly shown in Fig. 13. This shaft 109 carries the neck-label-carrying roller 99, and this roller is therefore operated through these levers by the gear 94 on the backward movement of the table 5, while on the forward movement of the table these levers remain stationary and the roller 99 is in contact with the fountain-roller 120 on the shaft 165, journaled in the arms 163 and 164, and which may be supplied with paste by the reservoir 111 through the lip 148', which lip is regulated by the thumb-screw 155, or may be supplied with paste in any other suitable manner, the usual doctor-blade 112 being applied to regulate the film of paste taken by the roller 99 from the reservoir 111, and a drip-box may also be provided, as shown in Figs. 11 and 15. This roller 99 is of the proper diameter to pick up the label and convey it to the disk 80, so that the edges of the label will be brought above the pins 106, which pins are then released and penetrate the label. Suitable grooves may be provided on the roller 99 to permit of this action. It is preferable in this case that the pins which will be nearest the bottle be shorter than the others to prevent injurious contact therewith. As the table goes backward, carrying back the driving-gear 95, the disk 80 remains stationary; but the long arm of the lever 101 is brought forward, and the roller 99 is brought down in contact with the ungummed edge of a pack of labels 105. The labels 105, which are held in a suitable frame 84, may be fed upward, so as to insure the top label being in line to be taken by the conveying pasting-roller 99 by a variety of devices.

The labels 105, as shown, are placed in the label-holder 84 with their printed side face down and are gummed together on the broad end nearest the disk 80 away from the paste-roller 120, so that when the label-carrying roller, which has previously received its coat of paste, rolls or revolves over the surface of the upper one it revolves it around its periphery and carries it over to the disk, where gripper-pins catch its broad end (the end that was gummed) and pulling it from the carrying-roller lays it upon its respective label-bed with the pasted side uppermost ready, as soon as the disk has received a half-revolution, to be applied to the neck of the next bottle.

The label-holder 84 consists of a box-frame attached to the frame 83, (see Figs. 11 and 15,) and this box-frame is suitably designed to receive different sizes and styles of neck-labels. The frame 83 has an elongated opening, as shown in Figs. 4 and 10, allowing the neck-labels to be fed up through it, and the box-frame 84 is provided with a vertically-movable bottom held in place and supported by a screw 110, screwed into the frame 83. (See Figs. 11, 14, and 15.) This screw is provided with a ratchet 158 firmly secured thereto, so that a movement of the ratchet will turn the screw and move the bottom of the label-holder either up or down, according to the direction in which the ratchet is moved, and it will thus be readily seen that the neck-labels can be fed upward through the opening in the frame 83 by a movement of the ratchet 158. A pawl 159 engages the teeth of the ratchet 158 and is held in place by a spring 160, as shown in Figs. 1, 4, 10, and 11, the pawl and spring being attached to a lever-arm 157, (see Figs. 4, 14, and 15,) which is normally pulled forward toward the disk 80 by a spring 156. The arm 157 extends on one side beyond the frame 83 and directly against the arm 101, so that when this arm 101 moves forward the spring 156 pulls the arm 157 and the pawl 159 forward, so that the ratchet and its screw are turned and the bottom of the box and its labels moved vertically upward, and the teeth and the thread of the screw are so made that the labels will be raised the thickness of one label on each forward movement of the arm or lever 101. As the lever 101 is carried backward it forces the arm 157 back, and the pawl 159 slips over the teeth of the ratchet, as that is held in place from backward movement by the pawl 161, held by its spring 162, both being secured to the under side of the table portion of the frame 83.

The roller 99 has a gear 132 meshing on the forward movement of the roller with the teeth of the rack-bar 115 on one upper side of the frame 83, and this roller 99 is on the shaft 109, which shaft is carried by the arm 102, and on one side of the arm 102 is a spring 114, holding it in sufficient contact to cause the pasted surface of the roller 99 to pick up the label and wrap it about its surface, leaving the proper amount of paste thereon, this roller being provided with the gear engaging with the rack 115, which insures its uniform transfer of the label. Retaining-pins 106 having penetrated the edge of the label, the backward movement of the roller 99, which takes place over the elastic surface 81 or 82, attached to the disk 80, will cause the label to be laid smoothly thereon, the pasted surface upward. The roller 99 still moves on in contact with the rack 115 until near the pack of labels 105, when the pawl 116 engages with the cam-plate 117, which straightens it up and lifts the roller 99 out of contact with the labels 105. The heel 118 of lever 102 engages the stop 119 and is brought in strong contact with fountain-roller 120. The reverse movement of the table 5 which now takes place only moves the gear 95 and the disk 80, and the bottle having been placed in position and pressing against said label will cause the label to adhere thereto, while the pins 106 will be withdrawn and retained in position until the next operation, customary pawls and catches preventing the improper movement of the gears.

The revolving neck-label-carrying disk 80 is provided on its under side with two rocking shafts 134, carrying projecting curved retaining-pins 106, of which number I believe four on each shaft will be found preferable, and on one end of each of these rocking shafts there is provided a triangular-shaped cam 135, oscillating through an aperture 136 in the disk 80.

The label-carrying disk 80 should move only in one direction and that to receive and apply its label, it receiving its label while stationary and is held by a retaining-spring 138, secured to the frame 83, until the next forward movement. During the backward movement of the gear 95 the cam-plate 113 on gear 95 is brought in contact with the triangular cam 135 on the rocking shaft 134, causing the retaining-pins 106 to penetrate the label. Now as the gear 95 reverses its movement, going forward, it causes the label-carrying disk 80 to carry the label under the neck of the bottle. The cam 135 on one of the retaining-pins rock-shafts comes in contact with the trip-finger 139. It will cause pins 106 to be withdrawn and retained in position until the next operation. The trip-finger 139 is secured to the table or frame 83. The spring-plate 166, secured to the under side of the disk 80, is to hold the rocking shaft in position and give the desired pressure to retain it in position. There may be, if desired, a spring-plate 166 for each rocking shaft 134.

The neck-labeling mechanism illustrated in Fig. 15 shows the position of the different parts at the extreme end of the movement of the new device to impart motion to the fountain-roller 120 on the neck-label mechanism from the driving-gear 95 as it oscillates backward and forward. The gear 95 meshes into a pinion-gear 121 on an upright shaft 122. On this shaft is also a miter-gear 123, meshing into a miter-gear 124, made fast on a horizontal shaft 125, and also a spur-gear 126, running loose on the same shaft 125, and on this same shaft on its outer end is a ratchet-wheel 127, made fast to the shaft 125. On the spur-gear 126 is pivoted a pawl 128, that engages with the ratchet 127. The spur-gear 126 meshes into a larger intermediate spur-gear 129, running loosely on stud-pin 141, fastened to a hub on the table-frame 83. This gear 129 meshes into the intermediate gear 130, running loose on stud-pin 131, fastened into the upright bracket 163. This gear 130 meshes into gear 132 on fountain-paste-roller shaft 165, causing the paste-roller to revolve in one way only, and as the fountain-roller 120 comes in contact with the label-carrying roller 99 it applies the paste on it to paste the neck-label when it comes in contact with the label and takes it up. The shafts 122 and 125 have a journal-bearing in the bracket or hanger 133, fastened to the under side of the table or frame 83. The upper end of shaft 122 has a bearing in the table or frame 83.

What I claim, and desire to secure by Letters Patent, is—

1. A horizontal label-applying mechanism in combination with a revolving-disk label-applying mechanism and means connecting the two mechanisms, substantially as shown and described.

2. A bottle-body-label table applying mechanism in combination with a revolving bottle-neck-label-applying mechanism and means connecting the same.

3. A bottle-body-label table applying mechanism in combination with a revolving bottle-neck-label-applying mechanism, and means for feeding the body-table-applying mechanism with single labels.

4. A bottle-body-label table applying mechanism in combination with a revolving bottle-neck-label-applying mechanism, and means for supplying the revolving neck-label mechanism with single labels.

5. A bottle-label-applying mechanism consisting of a longitudinally-moving table with means for feeding and applying body-labels, a revolving table operated by the longitudinally-moving table and means for applying and feeding neck-labels to the same.

6. In a bottle-label-applying mechanism, a horizontally-moving table, means for adjusting a label upon the table from a label-supply mechanism, a rotating table, means for adjusting a neck-label upon the rotating table from a label-supply mechanism and means for adjusting the rotating table to bring the neck-label in contact with the neck of a revolving bottle.

7. An adjustable neck-label-supply mechanism in combination with an adjustable rotating table for carrying neck-labels into position for application to the conical portion of a bottle and means connecting the mechanism and table.

8. A horizontal-table label-feeding mechanism in combination with a revolving-disk label-feeding mechanism and means connecting the said mechanisms, substantially as shown and described.

9. A horizontal-table label-feeding mechanism in combination with a revolving-disk label-feeding mechanism operated by the table label-feeding mechanism, substantially as shown and described.

10. A horizontal-table label-feeding mechanism in combination with a revolving-disk label-feeding mechanism and means for supplying the disk with pasted labels, substantially as shown and described.

11. A horizontal-table label-feeding mechanism in combination with a disk operated by the forward movement of the table and means for supplying the disk with a pasted label.

12. A horizontal-table label-feeding mechanism in combination with a revolving-disk label-feeding mechanism and means for supplying the table with a pasted label.

13. A horizontal-table label-feeding mechanism in combination with a revolving-disk label-feeding mechanism operated by the forward movement of the table and means for supplying a pasted label to the table.

14. A horizontal-table label-feeding mechanism in combination with a revolving-disk label-feeding mechanism operated by the forward movement of the table and inoperative by the backward movement of the table.

15. A horizontal-table label-feeding mechanism in combination with a revolving-disk label-feeding mechanism operated by the forward movement of the table and inoperative by the backward movement of the table, and means for supplying the table with a pasted label.

16. A horizontal-table label-feeding mechanism in combination with a revolving disk operated by the forward movement of the table and inoperative by the backward movement of the table, and means for supplying the disk with a pasted label.

17. A horizontal-table label-feeding mechanism in combination with a revolving disk operated by the forward movement of the table and inoperative by the backward movement of the table, means for supplying the table with a pasted label and means for supplying the disk with a pasted label.

18. A horizontal-table label-feeding mechanism in combination with a revolving disk operated by the forward movement of the table and inoperative by the backward movement of the table, and means for supplying the table with a pasted label on the backward movement of the table.

19. A horizontal-table label-feeding mechanism in combination with a revolving disk operated by the forward movement of the table and inoperative by the backward movement of the table, means for supplying the table with a pasted label on the backward movement of the table and means for supplying the disk with a pasted label while the disk remains stationary but during the backward movement of the table.

20. A horizontal-table label-feeding mechanism in combination with a revolving disk provided with a pair of label-beds, operated by the forward movement of the table but inoperative on the backward movement of the table and means for supplying the label-beds of the disk alternately with pasted labels on the forward movement of the table.

21. In combination with a horizontal-table label-feeding mechanism, a revolving-disk and a horizontal label-supply mechanism with means for pasting and feeding the top label to the revolving disk.

22. In combination with a body-label-feeding mechanism, and means for rotating the bottle, a rotating table carrying neck-labels into position for application to the revolving bottle.

23. A horizontal bottle-body-label-feeding mechanism in combination with a revolving-disk neck-label-applying mechanism and a neck-label-pasting mechanism for pasting labels and actuated by the movement of the table.

24. In combination with a body-label table applying mechanism, a revolving-disk and a neck-label-supply mechanism for adjusting neck-labels singly upon the revolving disk actuated by the movement of the body-label table.

25. An adjustable neck-label-supporting device for supporting and feeding neck-labels in combination with a revolving disk adjustable at a fixed point for applying one of the labels to the neck of the bottle during rotation of the bottle in contact with the label, substantially as described.

26. An adjustable neck-label-supporting device in combination with a revolving disk provided with a socket for holding a bottle-nose during rotation of the bottle in contact with the neck-label, substantially as shown.

27. An adjustable body-label supporting and applying device in combination with an adjustable neck-label-supporting device, and a neck-label-applying disk adjustable at a fixed point for applying the neck-label during rotation of the disk in contact with the bottle, substantially as shown.

28. In a bottle-body-label-attaching machine, the combination of a frame, a pawl attached to said frame, a movable label-supporting device provided with a ratchet and operated by the pawl on each backward movement of the label-supporting device.

29. In a bottle-body-label-attaching machine having a framework, the combination, of a horizontally-movable label-supporting device, provided with a ratchet, a pawl attached to said frame for operating the ratchet and adjusting the labels on each backward movement of the device.

30. In a bottle-body-label-attaching machine, the combination, of a horizontal label-supporting device attached to a horizontally-moving table and means for supplying said table with the labels from the supporting device.

31. In a bottle-body-label-attaching machine, the combination, of a moving table, a label-supporting device attached to the moving table and means for adjusting the supporting device on each backward movement of the table.

32. In a bottle-label-attaching machine, the combination, of a longitudinally-moving table, a label-supporting device attached to the under side of the table and means for adjusting the supporting device on each backward movement of the table.

33. In a bottle-body-label-attaching machine, the combination, of a horizontally-moving table, a horizontal label-supporting device attached to the under side of the table and means for adjusting the supporting device on each backward movement of the table.

34. In a bottle-body-label-attaching machine, the combination, of a moving table, a label-supporting device attached to the table and provided with a ratchet, a pawl for operating the ratchet and adjusting the labels on each backward movement of the table.

35. In a bottle-body-label-attaching machine, the combination, of a horizontally-moving table, a horizontal label-supporting device attached to the under side of the table, a ratchet attached to the supporting device, a pawl for operating the ratchet and adjusting the labels on each backward movement of the table.

36. In a bottle-body-label-attaching machine provided with a frame, the combination, of a horizontally-moving table, a horizontal label-supporting device attached to the under side of the table, a ratchet attached to this device, a pawl attached to the frame and in contact with the ratchet on each backward movement of the table for adjusting the label-supporting device.

37. In a bottle-labeling machine provided with a frame, the combination of a moving table, a body-label-supporting device attached to the table and having a vertically-movable bottom, a vertical screw-shaft supporting said bottom, a frame suspended from the under side of the table and supporting the screw-shaft, the screw-shaft being provided with a ratchet, and a pawl attached to the frame of the machine and adapted to engage the ratchet on the backward movement of the table.

38. In a bottle-labeling machine provided with a frame, the combination of a horizontally-moving table, a horizontal body-label-supporting device attached to the under side of the table and having a vertically-movable bottom, a vertically-movable screw-shaft supporting said bottom, a frame suspended from the under side of the table supporting said screw-shaft, a ratchet attached to said screw-shaft, a pawl attached to the frame of the machine and said pawl adapted to engage said ratchet and move the labels vertically on the backward movement of the table, substantially as shown and described.

39. In a bottle-labeling machine having a frame, in combination with a bottle-rotating device mounted at fixed points on the frame, a horizontal body-label-carrying device, a table movable on said frame and supporting the label-carrying device, and means for removing the labels from the carrying device and attaching them upon the table.

40. In a bottle-labeling machine having a frame, in combination with an adjustable bottle holding and rotating device mounted at fixed points on the frame, a horizontal body-label-carrying device, a table movable on said frame and supporting the label-carrying device, and means for removing the labels from the carrying device and attaching them upon the table.

41. In a bottle-labeling machine having a frame, in combination with a bottle holding and rotating device mounted at fixed points, and provided with a pivoted arm operated by the movement of the table, a horizontal body-label-carrying device, a table movable on said frame and supporting the label-carrying device, and means for removing the labels from the carrying device and attaching them upon the table.

42. In a bottle-labeling machine having a frame, in combination with a device mounted at fixed points for holding and rotating a bottle, a pivoted arm attached to said device and allowing of the changing of bottles, a horizontal body-label-carrying device, a table movable on said frame and supporting the label-carrying device, and means for removing the labels from the carrying device and attaching them upon the table.

43. In a bottle-labeling machine having a frame, in combination with a device mounted at fixed points for holding and rotating a bottle, an arm pivoted to said device and operated by the movement of the table, a horizontal body-label-carrying device, a table movable on said frame and supporting the label-carrying device, and means for removing the labels from the carrying device and attaching them upon the table, substantially as shown.

44. In a bottle-body-labeling machine in combination with a frame, a horizontal label-supporting device, a movable label-bed table, a label-paste-carrying roller adapted to revolve over the unprinted side of the upper label, gripper-pins for engaging and peeling the label from the roller and laying the same upon the label-bed, substantially as shown.

45. In a bottle-labeling machine the combination, of a bottle-carrying device, label-feeding mechanisms, a body-label table adapted to carry the body-label beneath the bottle, and a neck-label disk adapted to revolve the neck-label beneath the neck of the bottle.

46. In a horizontal label-applying device, a label-paste-carrying roller, a gear attached to said roller, bottle-revolving rollers, gears attached to said rollers, intermediate gears meshing with said roller-gears, a rack-bar attached to and moving with the table and having teeth in which mesh the gear of the label-paste-carrying roller and the intermediate gears of the bottle-revolving rollers, substantially as shown and described.

47. In a labeling-machine, a label-paste-carrying roller, a gear attached to said roller, bottle-revolving rollers, gears attached to said rollers, intermediate gears meshing with said gears, a rack-bar attached to and moving with the table and having teeth in which mesh the gear of the label-paste-carrying roller and the intermediate gears of the bottle-revolving rollers, a revolving neck-label-applying disk, a gear connected with said disk, and a second rack-bar meshing with the gear of the disk, substantially as described.

48. In a bottle-labeling machine provided with a frame, a label-paste-carrying roller, elastic-seat label-carrier, a body-label lever provided with a toggle-joint and attached to the label-carrier, the lever pivoted at its opposite and lower end to the frame, a drive-wheel, and a link connecting the lever and the drive-wheel, substantially as shown and for the purposes stated.

49. A bottle labeling and applying mechanism in combination with a horizontal label-carrier, a frame, brackets attached to the frame, a paste-fountain supported by said brackets, a roller for receiving paste from the fountain, a lip on the under side of the fountain for regulating the flow of paste therefrom, and a screw for adjusting the lip, and the horizontal label-carrier adapted to receive paste from the paste-roller, substantially as shown.

50. In a bottle-body-labeling machine, a horizontally-moving table, a paste-fountain, a paste-carrying roller, a doctor-blade for regulating the body of paste on the roller, a body-label-supporting device having vertically-movable labels gummed at one end and the top label arranged to be engaged by the paste-carrying roller and gripper-pins for releasing the label from the paste-carrying roller and applying it to the label-applying device.

51. In a bottle-body-labeling machine a movable table provided with an opening, a label-supporting device and means for feeding the labels upward through the opening, a paste-carrying roller for engaging each top label on each forward movement of the table, substantially as shown and described.

52. In a bottle-labeling machine a paste-roller, a paste-carrying roller, a movable table provided with labels, a cam-rib attached thereto, a pivoted arm attached to said paste-carrying roller and engaging the cam-rib upon the backward movement of the table to throw said paste-carrying roller out of contact with the paste-roller and above the body of the labels, substantially as shown and described.

53. In a bottle-labeling machine, in combination with a horizontal moving label-applying table, a pack of labels, a paste-carrying roller adapted to carry and apply paste to the top label, pivoted arms attached to said roller, a stud attached to one of said arms, a cam-rib provided with a tongue, and the stud adapted to ride upon said tongue onto the cam-rib to throw the roller out of contact with the labels upon its backward movement, substantially as shown and described.

54. A labeling-machine having applying devices in combination with a label-pasting device having a roller for wrapping a label around the roller, of a shaft, curved rocking pins mounted thereon and adapted to engage the end of the label on the forward movement of the applying device peeling the same from the pasting device and laying the same upon the applying device, substantially as shown and described.

55. In a labeling-machine in combination with label-applying means of a frame, plates attached to the frame, brackets attached to the plates, intermediate driving-gears, elastically-covered rollers, and gears for said rollers, all mounted upon said brackets, the intermediate gears meshing with the roller-gears, a rack-bar for operating the rollers and the rollers adapted to engage and revolve the bottle during the application of the label, substantially as shown and described.

56. In a labeling-machine, the combination with a label-table, of a paste-roller, a paste-carrying roller constructed to receive paste from the paste-roller, and to revolve over a vertically-fed pack of labels so that the upper label will adhere to and receive paste from it, gripper-pins and means for throwing the gripper-pins into the label and operating them so that the label will be placed upon the label-table with its pasted side uppermost, substantially as shown.

57. In a labeling-machine, in combination with a frame, a table movable on the frame for carrying a label beneath a bottle, brackets on the frame, pivotally-mounted arms held by said brackets provided with uplifting curved fingers to engage the bottle and suitable grooves in the table for receiving the curved lifting-fingers, substantially as shown.

58. In a labeling-machine, in combination with a frame, a label-table horizontally movable on the frame for horizontally carrying a label beneath a revolved bottle, brackets on the frame, pivotally-mounted arms held by said brackets provided with uplifting curved fingers to engage the bottle, suitable grooves in the table for receiving the curved lifting-fingers, a cam-rib attached to the label-table, an arm projecting downwardly from one of the pivotally-mounted arms and having a stud engaging the cam-rib for raising the curved fingers, substantially as shown.

59. In a bottle-labeling machine, in combination with a standard, a table movable horizontally for carrying a label horizontally beneath a bottle, means for rotating the bottle upon the label, brackets on the frame, pivotally-mounted arms held by the brackets provided with vertically-movable curved fingers arranged to engage the bottle on its under side, suitable elongated openings in the table for receiving the fingers, a runway attached to the side of the table, an arm projecting downwardly from one of the pivotally-mounted arms, a stud upon the arm adapted to pass along the runway, and a spring for holding said arm and curved fingers downward except when the downwardly-projecting arm is held upward by contact of the stud with the runway, substantially as shown.

60. In a labeling-machine, in combination with a label-attaching device, a plate attached to its under side, a shaft journaled therein, curved gripper-pins attached to the shaft, a rack-bar attached to the label-attaching device, a stud inserted in the rack-bar, a latch pivoted on said stud, a crank upon the shaft adapted to engage and normally rest upon the latch, the attaching device, plate and rack-bar moving in unison, a spring upon the latch pressing against the under side of the attaching device, the latch provided with a seat for holding the crank, a stud 33 adapted to come in contact with the latch and release the crank, a spring 34 attached to the shaft and adapted to throw the gripper-pins through an elongated slot, and a latch 66 for throwing the crank upon the latch 32, substantially as shown and described.

61. In a bottle-labeling machine a longitudinally-moving body labeling pasting and applying device in combination with a neck-labeling disk actuated by this device and adapted to make a half-revolution applying the neck-label as the device is moved from right to left, substantially as shown.

62. In a bottle-labeling machine a longitudinally-moving body labeling pasting and applying device in combination with a revolving neck-labeling disk in contact with the device so as to rotate intermittently and provided with two label-beds in diametrically opposite positions, substantially as shown.

63. In a bottle-labeling machine a longitudinally-moving body labeling pasting and applying table in combination with an adjustable neck-labeling disk, the disk being adjustable so that it will revolve at an angle to the table, and the lower side of the disk engaging the rear of the table, substantially as shown.

64. In a bottle-labeling machine a longitudinally-moving body labeling pasting and applying table in combination with a neck-labeling disk, a rack-bar 28' attached to and moving with the table, and the disk having teeth curved to provide for the angles and engaging with the teeth 150 of the rack-bar, substantially as shown.

65. In a bottle-labeling machine in combination with a horizontally-reciprocating body-label applier, a neck-label applier, a fountain-roller and means for imparting motion to the roller from the body-label applier, substantially as shown and described.

In testimony whereof I affix my signature in presence of two witnesses.

LUTHER CHILD CROWELL.

Witnesses:
OLIVER H. LINNELT,
SABRINA A. SMITH.